United States Patent [19]

Cosenza

[11] 4,119,131
[45] Oct. 10, 1978

[54] FASTENER WITH WIRE-FORM HOLDOUT

[75] Inventor: Frank J. Cosenza, Rancho Palos Verdes, Calif.

[73] Assignee: Tridair Industries, Torrance, Calif.

[21] Appl. No.: 774,405

[22] Filed: Mar. 4, 1977

[51] Int. Cl.² .......................................... F16B 43/00
[52] U.S. Cl. ................................................. 151/69
[58] Field of Search ............... 151/69, 24, 25 A, 25 R, 151/6, 4, 31, 9; 85/3 R, 5 CP, 8.3, 1 K

[56] References Cited

U.S. PATENT DOCUMENTS

| 1,289,867 | 12/1918 | Moore | 151/9 |
| 1,587,397 | 6/1926 | Menard | 151/9 |
| 1,845,428 | 2/1932 | Llewellyn | 151/24 |
| 1,869,947 | 8/1932 | Shook | 151/69 |
| 2,087,002 | 7/1937 | Miehle | 85/3 R |
| 2,382,166 | 8/1945 | Martin | 85/8.3 |
| 2,433,138 | 12/1947 | Marcell | 151/44 |
| 3,055,015 | 9/1962 | Silverman | 85/3 R |
| 3,062,253 | 11/1962 | Millheiser | 151/69 |
| 3,141,487 | 7/1964 | Boyd | 151/69 |
| 3,995,675 | 12/1976 | Cosenza | 151/69 |

FOREIGN PATENT DOCUMENTS 573,227 11/1945 United Kingdom ................... 151/69

Primary Examiner—Marion Parsons, Jr.
Attorney, Agent, or Firm—Thomas A. Seeman

[57] ABSTRACT

A stud-like panel fastener with a wire-spring holdout for retaining the fastener in a retracted position on a panel. The fastener is formed with a bore extending from its leading end and a longitudinal slot at the lower portion of the fastener body in communication with the bore. A generally U-shaped wire spring member is carried within the bore with a lower protruding bearing surface on one leg of the member extending through the slot and beyond the periphery of the fastener body. When the fastener is retracted, the bearing surface of the spring member, in contact with the sidewall of the panel opening, holds the fastener against downward movement. Owing to the advantageous construction, the holdout is self-cleaning, as the sidewalls of the slot tend to wipe the bearing surface in use, and debris cannot build up behind the holdout and render it inoperative due to the large void behind the bearing surface. Also, the holdout can be quickly installed or replaced without special tools.

6 Claims, 6 Drawing Figures

FASTENER WITH WIRE-FORM HOLDOUT

BACKGROUND OF THE INVENTION

This invention relates to a panel fastener, and more particularly to an aircraft panel fastener with a holdout for holding the fastener in a retracted position when the fastener is disengaged from its nut member on the aircraft.

Panel fasteners for securing aircraft panels are well known in the art. The fastener, of the type this invention is concerned with, comprises a stud-like body with an enlarged head and secures a panel to an aircraft structure by being inserted through an opening in the panel and then engaged with a nut member attached to the aircraft structure. Typically the fastener is also captivated to the panel by a retaining ring which retains the fastener on the panel when the fastener is disengaged from the nut member.

To prevent the fastener from becoming damaged when the panel is removed and, for example, slid on a flat hard surface, on interfering with the positioning of the panel on the aircraft preparatory to fastening the panel, it is desireable in these instances that the fastener be held in a retracted position. In this position, the fastener extends outwardly to the maximum extent permitted by the retaining ring and the lower end of the fastener is substantially within the panel. The retention is usually accomplished by some type of spring holdout which is carried on the fastener and bears against the wall of the panel opening when the fastener is retracted, thereby holding the fastener. After the panel is positioned on the aircraft for installation, the fastener is depressed downwardly against the spring tension of the holdout to engage the nut member and thereby secure the panel.

A common problem associated with known holdouts is that sealant, ordinarily inserted between the panel and the aircraft structure, or other such debris, comes in contract with the spring member and piles up or packs in behind and around it causing it to stick or otherwise become inoperative. Another problem is that the spring member constituting the holdout is usually permanently installed on the fastener body and cannot be removed or replaced without special tools and equipment, if at all. Permanent installation of the spring member not only results in an additional cost of manufacture, but also prevents the holdout from being quickly replaced when damaged. Also, with the holdout permanently installed, the fastener cannot be easily overhauled. Periodic overhaul of the fastener is required in many instances to recoat the fastener with an anti-corrosive material.

SUMMARY OF THE INVENTION

This invention provides an effective solution to the above problems associated with aircraft panel fastener holdouts, as summarized in the following objects.

First, to provide an aircraft panel fastener with a holdout which is not susceptible of becoming inoperative by being clogged by sealant, or other such debris, with which the fastener may come in contact.

Second, to provide an aircraft panel fastener with a holdout which can be quickly and easily installed or replaced without the need of special tools or equipment.

Third, to provide an aircraft panel fastener with a holdout which is economical and feasible to manufacture and install.

The above objects are accomplished by a self-cleaning holdout comprising a U-shaped wire spring member with one leg having a bended section forming a protruding bearing surface. To receive the holdout, the aircraft panel fastener is formed with a bore extending from its leading end and a longitudinal slot in the lower periphery of the fastener in communciation with the bore. The spring member is installed in the bore of the fastener by being manually inserted therein with the bearing surface extending through the slot in the fastener body. After installation, the bearing surface of the spring member extends beyond the periphery of the fastener but is deflectible inwardly against the spring tension in the member.

The spring tension of the member holds the fastener in a retracted position when the bearing surface of the member comes in contact with the sidewall of the fastener opening in the panel through which the fastener is installed. Advantageously, the holdout is not susceptible to being rendered inoperative by sealant debris as the sidewalls of the slot in the fastener body clean the bearing surface of the holdout as the surface is deflected inwardly during use, and any sealant that may get trapped behind the bearing surface is pushed into the relatively large void in the fastener bore.

The holdout can be easily removed by deflecting the bearing surface out of the slot and into the bore and then pulling the entire spring member out of the bore by grasping a hook section, formed for this purpose, on the lower leg of the member with pliers or other such tool.

In one modification, the spring member is modified by being formed with two opposing bearing surfaces which extend through opposing slots in a modified fastener body. Installation, removal and operation of the holdout however is basically the same as for the first or preferred embodiment.

In a second modification, the spring member is formed with a helical torsion coil at its upper end to reduce the length of the spring member when a shorter bore depth in the fastener body is desired or necessitated. Other characteristics of the member are the same as described for the spring member of the preferred embodiment.

DESCRIPTION OF THE DRAWINGS

For a fuller understanding of the nature and objects of the invention, reference should be made to the follwoing detailed description taken in connection with the accompanying drawing in which.

DETAILED DESCRIPTION

Figure 1:
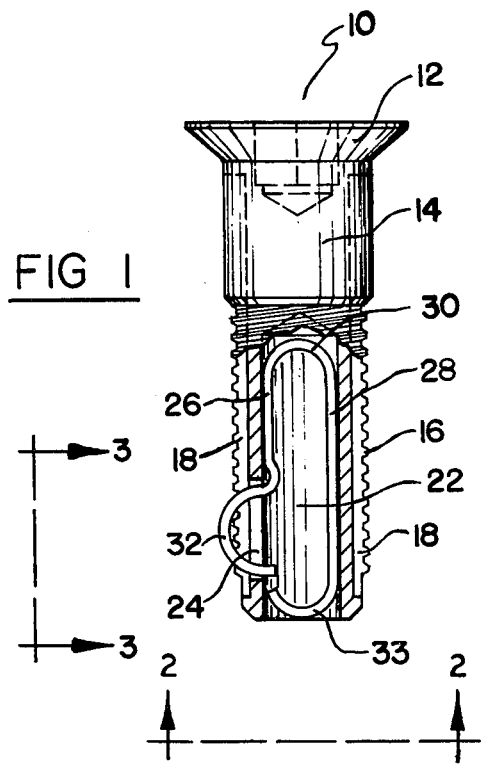
FIG. 1 is an elevational view, partially in cross section, of a preferred embodiment of the invention, particularly showing the manner in which the spring member, constituting the holdout, is housed within the bore of the fastener body.

As illustrated in FIGS. 1-4 of the drawings, the preferred embodiment of the aircraft panel fastener constituting this invention, generally indicated by the number 10, includes a stud-like fastener body with an enlarged drive head 12, a smooth shank portion 14, and a threaded portion 16. Located on opposite sides of the fastener body are longitudinal keyways 18 in which tabs or keys of an annular retaining ring 20 are slidably carried. The aforementioned construction is typical for such fasteners.

The fastener is further formed with a central, closed-ended bore 22 extending from the leading end of the fastener and substantially along its length. A narrow, longitudinal slot 24, in communciation with bore 22, extends through one of the keyways, adjacent the forward end of the fastener.

A holdout for the fastener comprises a relatively thick, U-shaped wire spring member, slightly smaller in diameter than the width of slot 24, having two extending legs 26, 28 and a connecting portion 30. The left leg 26, as viewed, extends outwardly and then inwardly at its lower end forming a protruding, curved bearing surface or portion 32 which, when the spring member is installed on the fastener, extends through slot 24 beyond the periphery of the fastener body with the lower reentrant end of the leg within bore 22. The curvature of the bearing surface is particularly determined with an optimum radius so that when a nut, not shown, is threaded on the fastener, the bearing surface will be deflected inwardly without damaging the threads of the nut or the spring member. This radius is selected to create an angle of approximately 45° between a line tangent to the bearing surface at the point of contact with the threads of the nut and a vertical plane. The right leg 28 extends below leg 26 and then leads back into the bore at its lower end forming a hook 33, which is provided as a grip to facilitate the removal of the spring member from the bore when desired.

The spring member is manually installed on the fastener body by inserting the member into the fastener bore 22 with the connecting portion 30 of the member toward the closed end of the bore and the bearing surface of the member extending through slot 24, with the other leg of the member bearing against the opposite sidewall of the bore. When the member is thus installed, the bearing surface is biased outwardly, but deflectible inwardly, by the spring tension in the member. When desired, the member may easily be removed by pushing the bearing surface into bore 22 and then withdrawing the member from the bore by grasping hook 33 with a pair of pliers. It should be understood that hook 33 is included only to facilitate the removal of the member, and it is not necessary for the operation or removal of the member that the hook be provided.

Figure 4:
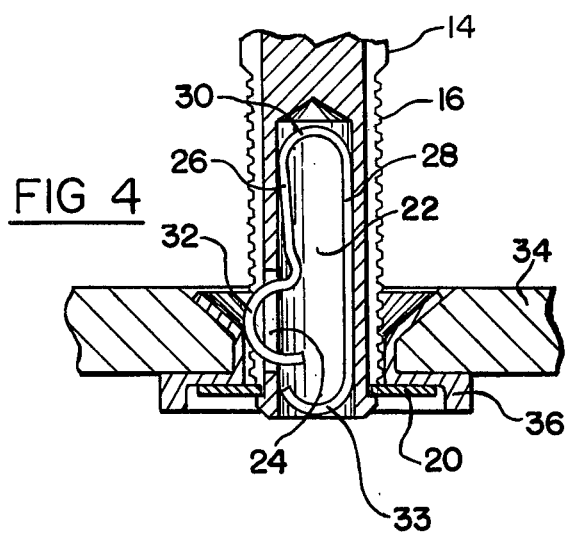
FIG. 4 is a partial elevational view showing the fastener of FIG. 1 installed on an aircraft panel, and particularly showing the manner in which the holdout holds the fastener in a retracted position thereon.

In FIG. 4, the fastener is seen in combination with an aircraft panel 34, only a portion of which is shown. A grommet 36 is carried within a hole on the panel forming a fastener opening. As is typical, the fastener opening is countersunk to receive the tapered head of the fastener flush with the surface of the panel when the panel is fastened to the aircraft structure. Grommet 36 is counterbored at its bottom end to receive the retaining ring 20 when the fastener is pulled outwardly to its retracted position as shown. In this position, the lower end of the fastener is substantially within the grommet and thus protected from being damaged should the panel be slid on a flat surface. Slot 24 in the fastener body is suitably located such that when the retaining ring is bottomed against the flange, the bearing surface 32 of the spring member bears against the sidewall of the grommet or panel opening to hold the fastener in its retracted position against downward movement. Although it is preferable to have the bearing surface of the holdout contact the sloping surface of the countersink of the panel opening as shown, it should be understood that the holdout will also function to hold the fastener by bearing against the vertical sidewall of the panel opening. When it is desired to engage the fastener with a nut member, not shown, attached to the aircraft structure, the fastener is pressed downwardly against the spring tension in the holdout. The bearing surface of the spring member deflects inwardly to permit the downward movement without damage to the spring member or the threads of the nut, as previously stated.

Figure 5:
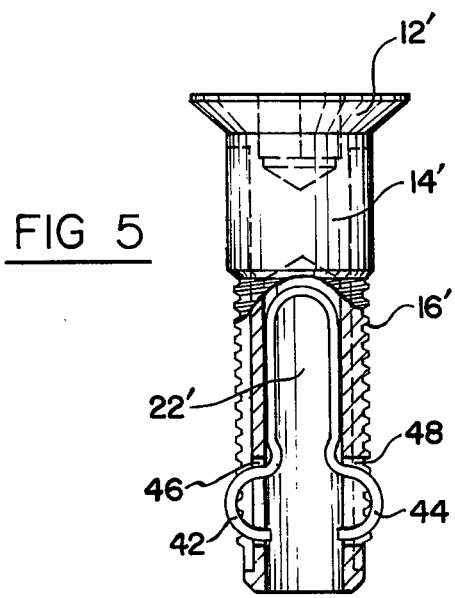
FIG. 5 is an elevational view, partially in cross section, of a first modification of the fastener with the spring member having two opposing bearing surfaces.
Figure 2:
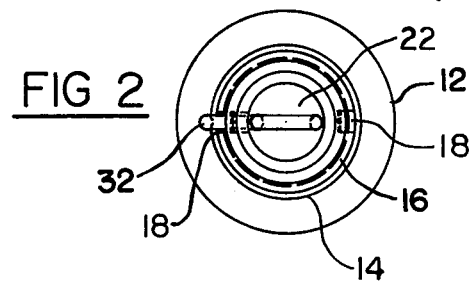
FIG. 2 is an end view of the fastener taken along line 2—2 of FIG. 1.
Figure 3:
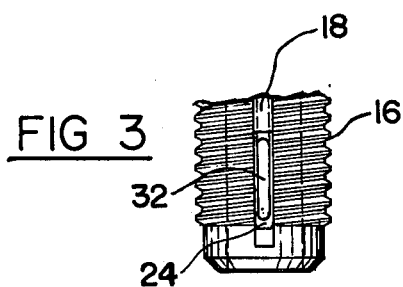
FIG. 3 is a fragmentary view of the fastener taken along line 3—3 of FIG. 1.

FIG. 5 illustrates a modification of the fastener modified with a different spring member. In this modification, instead of one leg of the spring member having a bearing surface thereon, as in the preferred embodiment, both legs of the member have at their lower extremities protruding, curved bearing surfaces 42, 44, and the fastener body is formed with two slots 46, 48 communicating with the bore of the fastener, each of which is located adjacent the lower end of the fastener. Other than the above, the structure of the modified fastener and holdout is the same as in the preferred embodiment. Identical parts are indicated by a prime symbol following the reference number.

Installation of the modified holdout is similar to the installation described for the preferred embodiment. That is, the holdout is inserted into the bore of the fastener with the bearing surfaces of the spring member respectively extending through the slots 46, 48 beyond the periphery of the fastener body. To permit the legs of the spring member to pass one another as they are deflected inwardly with their respective bearing surface, slot 48 is located opposite, but not diametrically opposite, slot 46. As should be easily understood, the bearing surfaces forced outwardly through the slots by the spring tension in the spring member operate in unison to hold the fastener in a retracted position in the aircraft panel by bearing against the sidewall of the fastener opening when the fastener is pulled outwardly, similar to that described previously for the preferred embodiment.

As is commonly recognized in the art, a characteristic of the type of spring member seen in the preferred embodiment and the first modification is that the spring tension in the member, and thus on bearing surface 32 (42, 44 in the modification) is dependent on the length of a moment arm drawn between a transverse line through the center of the bearing surface and the upper end 30 of the spring member. The greater the length of this moment arm, the less spring tension on the bearing surface and consequently, the less holding power of the holdout. Thus the spring member may be elongated or shortened to produce a desired spring tension for the holdout. Advantageously, holdouts with different spring tensions may be proprovided for the fastener and installed therein without changing the characteristics of the fastener body.

Figure 6:
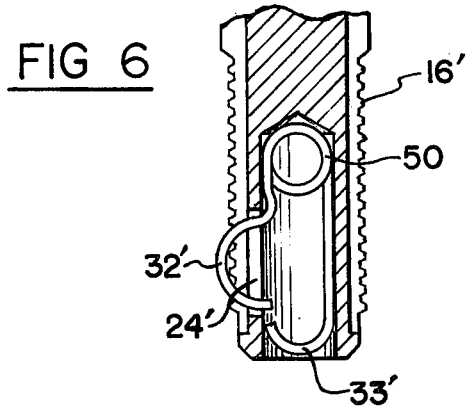
FIG. 6 is a fragmentary cross sectional view of a second modification of the fastener showing the spring member formed with a helical torsion coil at its upper end.

A second modification of the holdout is shown in FIG. 6. This modified holdout is preferably used where it is desireable to form the fastener body with a shorter bore to reduce the cost of manufacture or where such a shorter bore is necessitated because of height restrictions and a requirement of a shorter fastener body. In these instances, the spring member of the type shown in the preferred embodiment would not be satisfactory because a significant reduction in the height of the member to fit into a shorter fastener bore would result in excessive spring tension. This could cause the spring member to take a permanent set when the bearing surface is deflected inwardly in use. To reduce the height of the spring member without significantly affecting the spring tension in the member, the upper portion of the member, as viewed, is formed with a helical torsion coil 50 between the upper end of the member and the bearing surface 32'. Although the overall length between the top of the spring member and the bearing surface 32' is shorter, the spring member with the helical torsion coil has approximately the same spring tension as the spring member of the preferred embodiment of the same effective length; that is, a length of the member measured along the left leg from the center of the bearing surface to the upper most end of the member. The bearing surface 32' and hook 33', and the operating characteristics of the holdout are the same as described for the holdout of the preferred embodiment.

The above construction offers a substantial number of advantages. First, the wire spring holdout is self-cleaning as any sealant or other such debris that contacts and adheres to the bearing surface of the holdout is wiped off by the sidewalls of the slot in the fastener body when the bearing surface is deflected inwardly during use. Secondly, any sealant that may get caught behind the bearing surface will not pack in behind the bearing surface, but rather will pass into the relatively large opening in the fastener bore. Thus the holdout is not susceptible to sticking or otherwise becoming inoperative by debris packing in and around the holdout. Thirdly, the holdout can easily be installed or removed without the use of special tools or equipment, which permits the holdout to be quickly replaced in the field if damaged or in need of overhaul. Fourthly, different holdouts with different spring tensions may be provided for the fastener without changing the fastener body itself. Finally, owing to the particular construction of the holdout and the fastener, both the holdout and the fastener are economical and feasible to manufacture.

Now that the invention has been described, I claim:

1. An aircraft panel fastener with a wire-form holdout comprising:
    (a) a stud-like fastener body,
    (b) said body having a central bore extending inwardly from its forward end,
    (c) a longitudinal slot on said fastener body communicating with said bore,
    (d) a generally U-shaped wire spring member having two legs with one leg extending outwardly and then inwardly forming a curved, protruding bearing surface thereon,
    (e) said spring member housed in said bore with the bearing surface extending through said slot beyond the periphery of said fastener body and with the opposite leg of said member bearing against the opposite bore wall of the fastener bore,
    (f) said bearing surface of said spring member biased outwardly but deflectable inwardly through said slot, and
    (g) said opposite leg formed with a hook at its lower end to facilitate the removal of the spring member from the bore.

2. The fastener of claim 1 wherein said spring member is formed with a coil at its closed end.

3. An aircraft panel fastener with a wire-form holdout comprising:
    (a) a stud-like fastener body,
    (b) said body having a central bore extending inwardly from its forward end,
    (c) a longitudinal closed-ended slot on said fastener body communicating with said bore,
    (d) a generally U-shaped wire spring member having two legs with one leg extending outwardly and then inwardly forming a curved, protruding bearing surface thereon,
    (e) said slot having a width slightly wider than the diameter of said wire spring member,
    (f) said spring member freely housed entirely within said bore with the bearing surface extending through said slot beyond the periphery of said fastener body and with the opposite leg of said member bearing against the opposite bore wall of the fastener bore,
    (g) said bearing surface of said spring member biased outwardly but deflectable inwardly through said slot,
    (h) stop means slidably carried on said fastener for retaining said fastener to said panel,
    (i) said fastener carried within a fastener opening in said panel,
    (j) said fastener slidable within said fastener opening and having a retracted position when pulled outwardly to the extent permitted by the stop means,
    (k) said bearing surface arranged with respect to said stop means to come in contact with the wall of said fastener opening when said fastener is in its retracted position, and
    (l) said fastener held outwardly by the contact of said bearing surface with the wall of the fastener opening.

4. The fastener of claim 3 wherein said stop means is defined as a retaining ring.

5. The fastener of claim 3 wherein said spring member is formed with a coil at its closed end.

6. The fastener of claim 3 wherein said fastener is further defined as having first and second closed-ended longitudinal slots carried on said fastener body in communication with said fastener bore, said U-shaped wire spring member having a protruding bearing surface on each of said legs, one of said bearing surfaces extending through the first of said slots beyond the periphery of the fastener body and the other of said bearing surfaces extending through the other of said slots beyond the periphery of the fastener body, each of said bearing surfaces biased outwardly but deflectable inwardly through said respective slots, and said fastener restrained against vertical movement by the contact of the bearing surfaces with the sidewall of the panel fastener opening when said fastener is in said retracted position.

* * * * *